(12) United States Patent
Niederer et al.

(10) Patent No.: US 8,946,599 B2
(45) Date of Patent: Feb. 3, 2015

(54) ELECTRIC HEATING DEVICE

(75) Inventors: Michael Niederer, Kapellen-Drusweiler (DE); Kurt Walz, Hagenbach (DE); Franz Bohlender, Kandel (DE)

(73) Assignee: Catem GmbH & Co. KG, Herxheim Bei Landau (DE)

( * ) Notice: Subject to any disclaimer, the term of this patent is extended or adjusted under 35 U.S.C. 154(b) by 1903 days.

(21) Appl. No.: 11/765,596

(22) Filed: Jun. 20, 2007

(65) Prior Publication Data
US 2008/0000889 A1    Jan. 3, 2008

(30) Foreign Application Priority Data
Jun. 28, 2006  (EP) .................................... 06013287

(51) Int. Cl.
| | | |
|---|---|---|
| *B60L 1/02* | (2006.01) | |
| *B60H 1/22* | (2006.01) | |
| *F24H 1/00* | (2006.01) | |
| *F24H 1/12* | (2006.01) | |
| *F24H 3/04* | (2006.01) | |
| *F24H 3/08* | (2006.01) | |
| *F24H 9/18* | (2006.01) | |
| *H05B 1/02* | (2006.01) | |

(52) U.S. Cl.
CPC ............ *B60H 1/2221* (2013.01); *F24H 1/009* (2013.01); *F24H 1/121* (2013.01); *F24H 3/0441* (2013.01); *F24H 3/0464* (2013.01); *F24H 3/0476* (2013.01); *F24H 3/082* (2013.01); *F24H 9/1818* (2013.01); *F24H 9/1827* (2013.01); *H05B 1/0236* (2013.01); *B60H 2001/2278* (2013.01)
USPC ..................................................... 219/205

(58) Field of Classification Search
USPC .......... 219/201, 202, 205, 208; 392/465, 485, 392/497, 498, 500, 502, 487, 443, 492, 392/493; 165/75, 164, 179; 159/28.1
See application file for complete search history.

(56) References Cited

U.S. PATENT DOCUMENTS

| | | | | | |
|---|---|---|---|---|---|
| 846,544 | A | * | 3/1907 | Bremer et al. ................ | 392/487 |
| 945,904 | A | * | 1/1910 | Barrett .......................... | 219/401 |
| 1,188,556 | A | * | 6/1916 | Patterson ...................... | 392/487 |
| 1,529,200 | A | * | 3/1925 | Mercer ......................... | 392/487 |
| 1,561,898 | A | * | 11/1925 | Antisell ........................ | 159/29 |
| 1,985,830 | A | * | 12/1934 | Hynes .......................... | 392/492 |

(Continued)

FOREIGN PATENT DOCUMENTS

| | | |
|---|---|---|
| DE | 407558 C | 12/1924 |
| EP | 0 899 985 A1 | 3/1999 |

(Continued)

*Primary Examiner* — Dana Ross
*Assistant Examiner* — Renee L Miller
(74) *Attorney, Agent, or Firm* — Boyle Fredrickson, S.C.

(57) ABSTRACT

The invention under consideration relates to an electric heating device for heating a flowing medium with a housing, in which the at least one electric heating element of the electric heating device is held securely and fully shielded from the medium held in the circulation chamber by a separating wall that divides the housing into a heating chamber and a circulation chamber. The circulation chamber has inlet openings and outlet openings for introducing and removing, respectively, the medium. The heating element is preferably a PTC heating element and is held by means of a clamping force in a recess formed by the separating wall, said recess preferably projecting into the circulation chamber. The invention furthermore relates to a recuperator for converting electrical energy into thermal energy, particularly for an electric drive in a vehicle.

36 Claims, 7 Drawing Sheets

(56) References Cited

U.S. PATENT DOCUMENTS

| | | | |
|---|---|---|---|
| 4,162,395 A * | 7/1979 | Kobayashi et al. | 392/485 |
| 4,223,208 A * | 9/1980 | Kleinschmidt et al. | 219/530 |
| 4,327,282 A | 4/1982 | Nauerth | |
| 4,459,466 A * | 7/1984 | Nakagawa et al. | 392/307 |
| 4,477,715 A * | 10/1984 | Bell et al. | 219/205 |
| 4,571,481 A * | 2/1986 | Leary | 219/205 |
| 4,793,405 A | 12/1988 | Diggelmann et al. | |
| 5,278,940 A * | 1/1994 | Muller | 392/485 |
| 5,547,572 A * | 8/1996 | Stone | 210/232 |
| 6,124,570 A * | 9/2000 | Ebner et al. | 219/202 |

2004/0264951 A1 * 12/2004 Kuebler et al. ............... 392/485

FOREIGN PATENT DOCUMENTS

| | | |
|---|---|---|
| JP | 61131574 A | 6/1986 |
| JP | S63-105703 | 5/1988 |
| JP | 11083357 A | 3/1999 |
| JP | 2005240718 A | 9/2005 |
| KR | 1020050006713 | 1/2005 |
| KR | 1020050034998 | 4/2005 |
| WO | 0170530 A | 9/2001 |

\* cited by examiner

ELECTRIC HEATING DEVICE

BACKGROUND OF THE INVENTION

1. Field of the Invention

The invention under consideration relates to an electric heating device for heating a flowing medium, wherein, in the context of the invention under consideration, a medium is particularly understood as a liquid medium. In particular, the invention under consideration relates to an electric heating device for a motor vehicle, in this case, especially for a motor vehicle that is operated with a drive that gives off almost no process heat or that does not give off any pertinent quantity of process heat. Particularly included in this group are hybrid drives. Accordingly, the invention under consideration is intended to provide a heating device that is particularly suited for generating the heat that is required for the processes running in individual system parts of a motor vehicle, or at least the heat that promotes such processes. The heating device according to the invention should, in particular, be suitable for generating a larger amount of heat in the shortest time, in order to give off this heat within the shortest time to the corresponding system parts within the motor vehicle. At the same time, some of the attention of the invention under consideration should be given to avoiding overheating of the electric heating device caused by control errors.

2. Description of the Related Art

In the state of the art, it is known to use so-called resistance heating elements or even PTC heating elements in motor vehicles, whereby such heating elements are self-regulating, because these display a greater resistance as the heating increases and consequently allow a lower amount of current through. The PTC heating elements consequently have self-regulating characteristics that prevent these heating elements from overheating. The maximum temperature that a PTC resistor can reach at a given operating voltage can be influenced by certain parameters during the manufacture of the PTC heating elements, which does not have to be explained in more detail here.

PTC heating elements are accordingly routinely deployed in radiators, particularly those that serve to heat the passenger compartment in such vehicles whose drive unit in any case gives off insufficient waste heat for climate control in the passenger compartment.

From DE 39 07 179, an electric heating device with a housing is known, in which a multitude of PTC heating elements are arranged, whereby the liquid medium (in this case, water) that is to be heated flows directly around these PTC heating elements. The electric connecting elements leading to the electric heating elements accordingly lie freely in the medium to be heated, which does not comply with the safety requirements that should be required and that additionally carries the problem of the corrosion of the metallic parts of the connecting elements. Furthermore, the arrangement of the electric heating elements directly in the flow conduit hinders any maintenance and repair work.

OBJECT OF THE INVENTION

The object of the invention is to provide an electric heating device that complies with the above requirements, offers adequate safety and avoids the abovementioned problems, To solve this problem, the invention under consideration provides an electric heating device including a housing in which a separating wall is formed that divides the housing into a heating chamber and a circulation chamber that holds a medium through which the medium flows. An inlet opening is provided for feeding the medium into the circulation chamber and an outlet opening is provided for guiding the heated medium out of the circulation chamber. An electric heating element is held in the heating chamber. This differs from the state of the art as given in DE 39 07 179 in that the housing has a separating wall that divides the housing into a heating chamber and a circulation chamber. The medium can circulate in the circulation chamber from an inlet opening to an outlet opening. The circulation chamber is sealed off from the surroundings, i.e., it is accessible only through the inlet and outlet openings. On the side of the separating wall opposite the circulation chamber is located the heating chamber, in which is arranged at least one electric heating element which heats the medium flowing in the circulation chamber.

The electric heating device according to the invention offers the advantage that, due to the separating wall, the heat-dissipating medium, for example, water or oil, is reliably separated from the electric heating element. Accordingly, any heat-dissipating medium can be used, including such media as could, in the event of direct contact with the electric heating element, possibly damage this electric heating element and/or cause a short circuit.

With consideration to good heat conduction between the electric heating element and the circulation chamber, the housing is formed from a good heat-conducting material, preferably metal. Among the metals, aluminium is particularly preferred.

The electric heating element preferably comprises at least one PTC heating element, due to the merits already described in the preceding. At the same time, with a view to electrical insulation from the housing, the PTC heating element preferably lies against the separating wall with at least one ceramic plate as an intermediate layer. The ceramic plate is formed so that it is very thin, as a result of which the heat conduction from the PTC heating element to the separating wall is essentially not adversely influenced, although the PTC heating element is electrically insulated from the housing. Also possible are embodiments in which the PTC heating elements lie directly on a wall of the housing and the electricity is conducted to a pole of the PTC heating elements by means of a current feed to the housing, whereas another contact of the PTC heating element is electrically insulated from the housing.

It has been seen that in the case of one advantageous formation in which the housing is longer than it is wide and the inlet and outlet openings are cut into ends of the housing opposite one another along the length, an adequately large quantity of heat can be transferred from the electric heating elements to the medium. With a view to a uniform and effective delivery of the heat generated by the electric heating element to the medium, in accordance with a preferred further development of the invention under consideration, it is proposed that the separating wall form at least one recess running along the length of the housing in order to hold the at least one electric heating element in the heating chamber, whereby this recess projects into the circulation chamber, is open to the heating chamber and has flowing medium on both sides. With a view to good heat transfer from the electric heating element to the medium, the thickness of the electric heating element preferably roughly corresponds to the width of the recess. Preferably, a number of recesses are arranged along the width of the housing, parallel and one behind the other, by means of which the quantity transferred by the electric heating device can be relevantly increased. The recess preferably has a roughly U-shaped cross-section, whereby the recess's interior sides, formed by the opposing side pieces, are preferably flat. With a view to the use of identical electric heating elements for simple configuration of a heating device with a high heat output, the U-shaped recesses are formed with essentially the same depth, i.e., the tabs connecting opposing side pieces of the U-shaped recess end at the same height, so that the recesses project into the circulation chamber to the same depth. These recesses preferably end shortly before the bottom of the circulation chamber, whereby this bottom lies opposite the heating chamber. To allow the best-possible use of standard parts when forming the electric heating elements, a multitude of electric heating elements, one behind the other, are held in each of the recesses. The lower end of the heating elements is preferably held at a given level by being in contact with the tab.

Particularly when PTC heating elements are used, in view of the self-regulating characteristics of these electric heating elements, a heat transfer to both sides of sheet-like PTC heating elements that is as uniform as possible should be guaranteed. Accordingly, a further preferred development of the invention under consideration proposes that the electric heating element be pressed against the opposing side pieces of the recess in good contact by a pressure element likewise positioned in the recess, with the electric heating element held in the U-shaped recess. Preferably the electric heating elements are fully flat, as are the opposing side pieces, and preferably run slightly towards each other in a slightly conical arrangement, whereby the pressure element should also be formed in a wedge shape, so that the pressure element tightly wedges the heating element in the recess and ensures full-surface contact between the long sides of the U-shaped recess, the heating element and the wedge. The electric heating elements lie against at least one side piece, whereby, with a view to electric insulation from the housing, the electric heating elements do not have to lie directly at the side pieces, but instead are preferably electrically insulated from the housing by means of a thin ceramic plate. Out of consideration for improved protection against short circuit, thin electrically insulating plates are arranged on both sides of the flatly-formed electric heating elements, whereby these thin electrically insulating plates only insignificantly obstruct the heat transfer from the electric heating elements to the separating wall, especially at the opposing side pieces of the U-shaped recess.

The pressure element is likewise formed from a good heat-conducting material and preferably lies with its full surface against the heating element, optionally with the electrically insulating plate as an intermediate layer. In this way, good heat conduction to both sides of the electric heating element is guaranteed by the opposing side pieces of the U-shaped recess for transfer to the medium in the circulation chamber. To this end, the pressure element is pressed with a large force into the U-shaped recess, in order to brace the electric heating element in the recess, namely by introducing the pressure element along the length of plate-shaped electric heating elements. The later pressure surfaces of the electric heating element should be level and smooth for this. If the pressing forces are large, it is preferable that the pressure element be slid in against an electrically insulating plate formed by a ceramic plate, whereby the upper surface of this electrically insulating plate opposes the sliding-in motion of the pressure element with a lower frictional resistance. Practical attempts have shown that the insertion force for bringing the pressure element to a heating element amounts to several hundred Newton. Not least due to this reason, it is preferred to arrange a number of electric heating elements along the length of the recess, one behind the other, each one of which is braced in the recess by separate pressure elements. The pressure element preferably has a footprint that corresponds to the footprint of the electric heating element, so that heat generated by the heating element can be conducted transversely into the side pieces without disturbance.

Between the electrically insulating plates and the at least one PTC heating element arranged between them, preferably electric contact plates are arranged on each side of the PTC heating element and electrically contacted to the PTC heating elements. The contact plates preferably have extension sections formed on the contact plates as a single piece, whereby these extension sections project beyond the electrically insulating plates on diagonally opposing sides of the heating element. As one result of the diagonally offset arrangement of the extension sections it is prevented that these sections are opposed, spaced apart by the thickness of the PTC heating elements only, so that the risk of a short-circuit forming is further reduced and, furthermore, the electrical connection of the extension sections to a power supply is simplified, even while taking into consideration sufficient protection against short-circuit. The size of the surface area of the contact plates arranged between the insulating plates essentially corresponds to the outer surface of the at least one PTC heating element, whereby this outer surface faces the interior side of the insulating plate, with a view to the best possible electrical contacting of the PTC heating elements. Accordingly, each of the PTC heating elements is in contact with the contact plates across the entire surface. In contrast, the insulating plates also form a slightly projecting edge, also with a view to sufficient spacing of the heating elements from the housing along the circumference of the heating elements. The electric heating element can have one or more PTC heating elements. The use of a number of PTC heating elements is preferred particularly when the voltage is more than 230 V, in order to be able to operate these PTC heating elements as parallel resistors. Through this, the resistance realised with the individual PTC heating elements does not have to be unnecessarily reduced, which can lead to a reduced breakdown voltage. When the voltage is <230 V, a single PTC heating element is preferably realized in an electric heating element.

As already mentioned in the preceding, the electrical connection of the PTC heating elements is made via the extension sections that project beyond the insulating plates. With a view to the simplest possible connection of each of the extension sections, these extension sections, which are arranged in the recess, are arranged at essentially the same height, and the housing has at least one supporting surface in the area of the extension sections for a printed circuit board, which has contact recesses on its lower side, which faces the extensions, whereby the extension sections can be slid into these recesses. In the case of an arrangement of a number of heating elements, one behind the other, in the recess, according to a preferred further development of the invention under consideration, each of the extension sections can be contacted in a simple manner by means of forming the contact receptacle for several extension sections, arranged in a row, one behind the other, from contact plates that oppose one another and that lie on the extension sections under an initial tension. These contact plates accordingly extend essentially parallel to the extension sections and are pressed against the extension sections with an initial tension when the extension sections have been slid between the contact plates, so that good contacting is guaranteed. The contacting can be accomplished in a simple manner by means of sliding the printed circuit board onto the extension sections along the length of these extension sections, until the printed circuit boards lie directly on the bearing surface of the housing, preferably with an intermediate layer of electrical components or a cooling bar for these components.

Particularly when the heating device is used in the engine compartment of a motor vehicle, and for sealing the heating chamber, according to a preferred further development of the invention under consideration it is proposed to provide a cover that has a power and signal terminal and that seals the heating chamber. This cover furthermore has contact elements that act in combination with the plug-in elements on the upper side of the printed circuit board. The contact elements preferably can be slid into one another, forming a contact, when the cover is placed into position, and preferably extend parallel to the extension sections, so that the movement for placing the cover into position along the length of the extension sections not only leads to the contacting of the contact elements that lead to the power and signal terminal, but also to good retention of the extension sections at the opposite side of the printed circuit board.

The electric heating device according to the invention is particularly suitable as a heating device for the hybrid drive of a vehicle. Furthermore, the heating device according to the invention is also suitable as a recuperator for dissipating excess energy, which arises due to the generator operation of an electric motor during a regenerative brake application. Such excess electrical energy is initially used for filling an electric storage battery provided on the vehicle. Should this storage battery also have been fully charged, however, electrical energy must be dissipated, and the electric heating device according to the invention, which converts electrical energy into thermal energy, is particularly well-suited for this, whereby it is possible to discharge the thermal energy into the surroundings via, for example, heat exchangers or to use the thermal energy for heating the vehicle interior.

The invention under consideration is explained in more detail in the following using an embodiment in connection with the drawing. The figures show:

DETAILED DESCRIPTION OF THE PREFERRED EMBODIMENT

Figure 1:
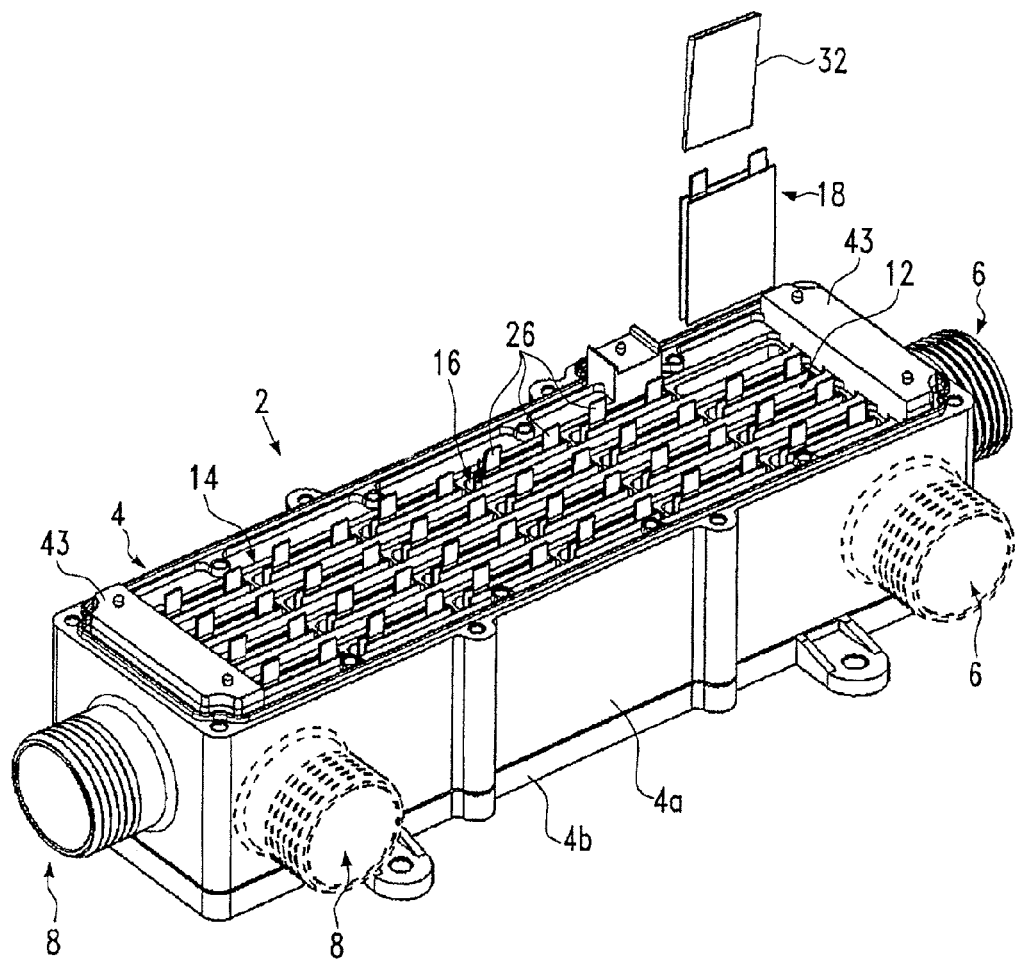
FIG. 1 a perspective top view of a part of the embodiment with the cover open.

FIG. 1 shows the embodiment of a heating device 2 with an elongated housing 4, consisting of an essentially cylindrical housing frame 4 and a housing base 4b screwed to it. Connecting pieces are arranged on a lateral surface of the housing frame 4a, on opposite ends of this elongated housing frame 4a, whereby these connecting pieces surround inlet and outlet openings 6, 8, whereby connection lines can be connected to these connection pieces via hose clips or the like, and whereby these connection lines lead to a circulation chamber 10 that is essentially surrounded by the housing frame 4a. In FIG. 1, the connecting pieces are arranged on the frontal ends of the housing frame 4a. Another arrangement of the connecting pieces on the opposing ends of the elongated housing frame 4a is indicated by dashed lines. This circulation chamber 10 is separated from a heating chamber 14 above it by a separating wall 12, namely in such a way that the fluid (for example, water) contained in the circulation chamber 10 cannot reach the heating chamber 14. In other words, the separating wall 12 fluidically separates the circulation chamber 10 and the heating chamber 14 from one another. The separating wall 12 can, for example, be formed on to the housing frame 4a as a single piece.

Figure 2:
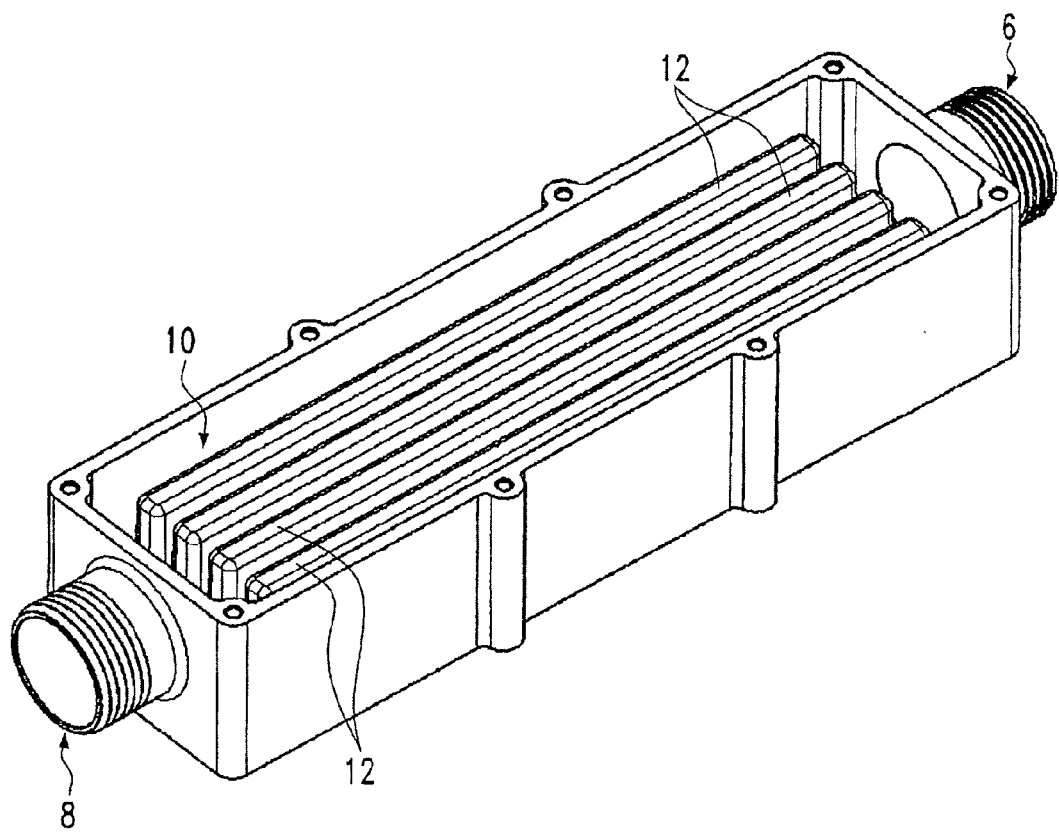
FIG. 2 a perspective top view of the bottom part of the housing with the housing base removed.
Figure 3:
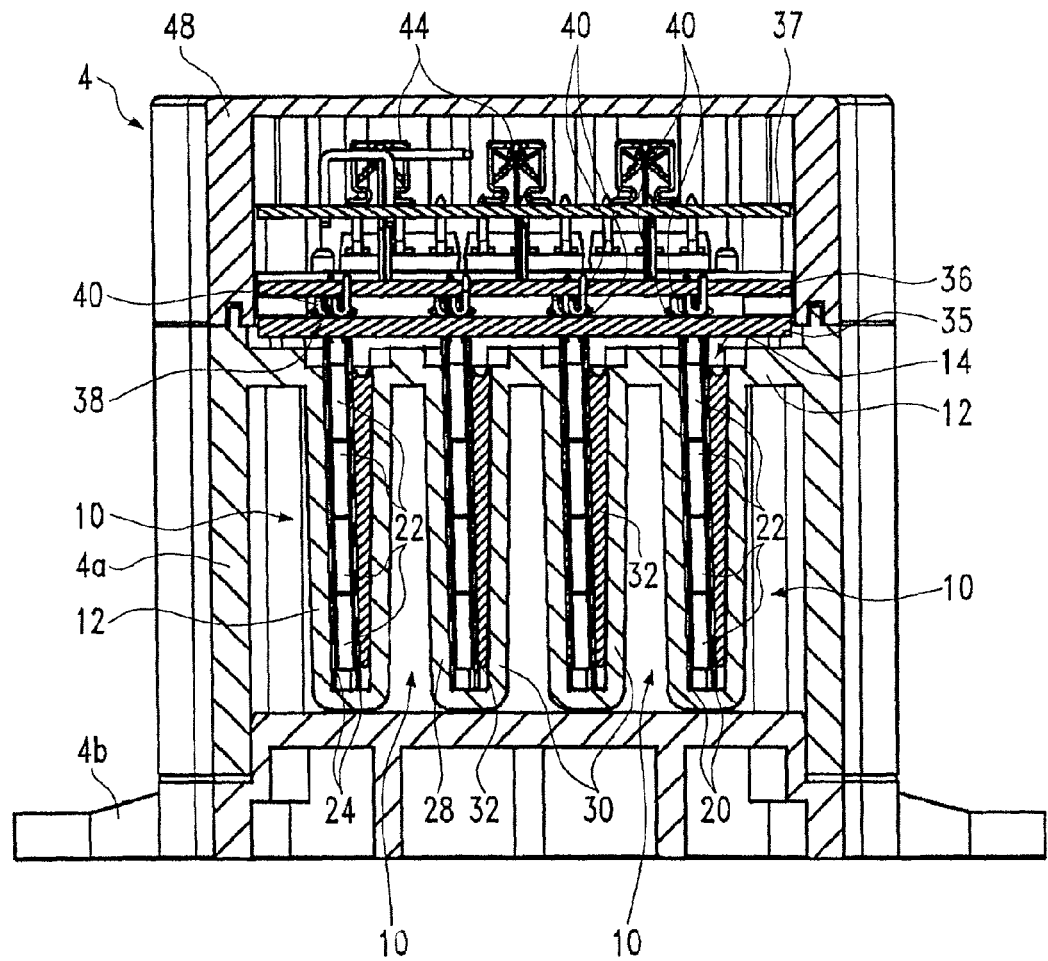
FIG. 3 a view of the longitudinal section through the embodiment shown in FIG. 1.

As FIG. 3 illustrates, the separating wall 12 forms a number of recesses 16 arranged one behind the other along the width, whereby these recesses 16 essentially extend across the entire length of the housing 4 (cf. FIG. 2). The separating wall 12 accordingly has a meandering shape with recesses 16 that project deeply into the circulation chamber 10, which recesses are completely sealed off from the circulation chamber 10 and open to the heating chamber 14. In other words, the circulation chamber 10 is fluidically isolated from the recesses 16. The recesses 16 include a closed end opposite an open end that is open to the heating chamber 14. Because these recesses 16 are preferably manufactured from a material that is a good conductor, particularly metal and, in this case, especially aluminum, manufacturing the separating wall 12 as, for example, a separate component by means of shaping suggests itself. The recesses 16 have a U-shaped cross-section and run along the length of the housing 4, parallel to one another.

Figure 4:
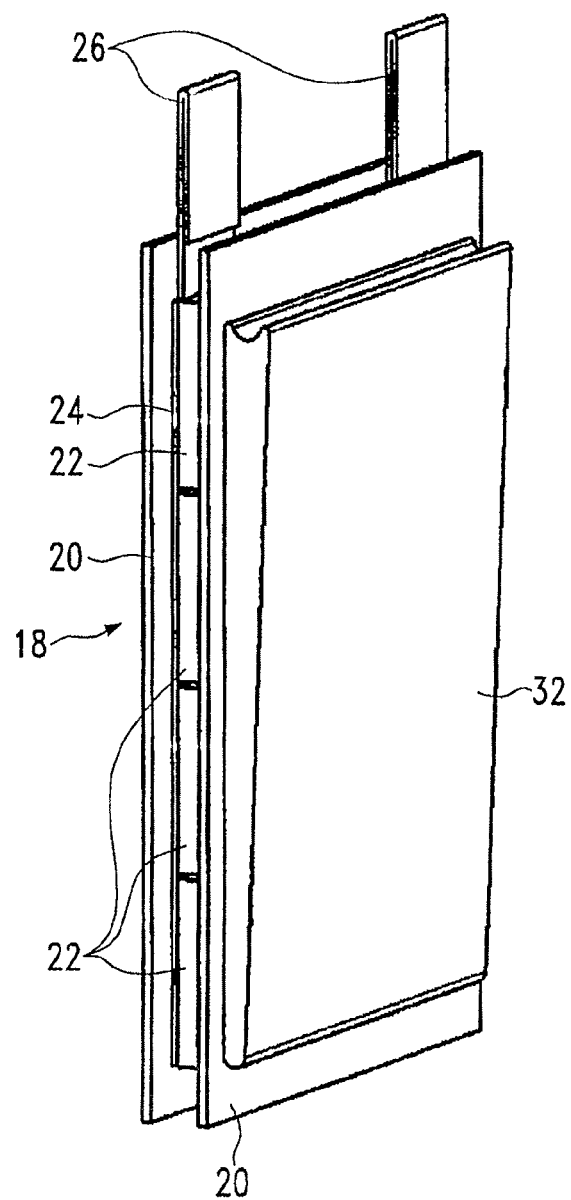
FIG. 4 a perspective top view onto an embodiment of an electric heating element which is used in the heating device according to FIGS. 1 to 3.

Heating elements 18, which have the design shown in FIG. 4, are located in each of the recesses 16. The exterior side of each of the heating elements 18 is formed by ceramic plates 20. A number of PTC heating elements 22 are arranged between these ceramic plates here. Contact plates 24 made of an electrically conducting material are, in turn, located between these PTC heating elements 22 and the ceramic plates 20. Extension sections 26 are formed on to these contact plates 24 as a single piece. The extension sections 26 of the contact plates which lie opposite one another are located on diagonally opposing sides. The extension sections are accordingly spaced apart from one another not only on the basis of the thickness of the PTC heating elements 22 but furthermore also essentially by the width of the heating elements 18. For reinforcement, the extension sections 26 are doubled by folding the material of the contact plates 24 one time in the thickness.

The ceramic plates 20, the PTC heating elements 22 and the contact plates 24 are preferably combined into one unit by means of gluing. As FIG. 4 illustrates, the ceramic plates 20 project beyond the PTC heating elements 22 and the contact plates 24 on all sides, forming an edge around the circumference. The heating elements 18 introduced into the recesses 16 lie on a side piece 28 of the U-shaped recess 16 with one of the ceramic plates 20. Between the opposing side piece 30 and the heating unit 18 is a pressure element 32, which is introduced into the recess 16 under tension and which is assigned to a single electric heating element 18. The respective pressure element 32 holds a single heating element 18 in the recess 16 and braces it against the opposing side pieces 28, 30 of the recess 16. The heating element 18 accordingly lies against the opposing side pieces 28, 30 with good heat conduction. Furthermore, the heating elements 18 stand up on a tab 34 of the recess 16, said tab 34 connecting the side pieces 28, 30, so that the heating elements 18 are accordingly fixed with respect to the height. The electric heating element 18 lies, with the lower face sides of the ceramic plates 20, on the tab 34, so that the electrically conducting parts of the heating element 18 are spaced at a distance from the metallic tab 34 and consequently insulated. The depth of the recesses 16 is furthermore selected in such a way that the medium in the circulation chamber 16 flows around the heating element 18 at least above the height of the PTC heating elements 22 that are stacked one on top of the other, i.e., the entire electric heating element 18 is held in the recess 16.

The U-shaped recesses 16 have a slightly conically tapered cross-section. The pressure element 32 is likewise formed in a wedge-shape, namely, with a pitch corresponding to the conical progression of the recess 16. The thickness of the pressure element 32 and the electric heating element 18 essentially corresponds to the width of the respective recess 16.

The pressure element 32 consists of a good thermally conducting material, for example, aluminium, and the thickness of the ceramic plates 20 is selected in such a way that the heat conduction from the heating elements 18 is scarcely interfered with by the material of the side pieces 28, 30. Because of the high degree to which the heating elements 18 are pressed together with the pressure element 32, the heat dissipation to the two sides of the elongated recesses 16 is virtually symmetrical.

Figure 5:
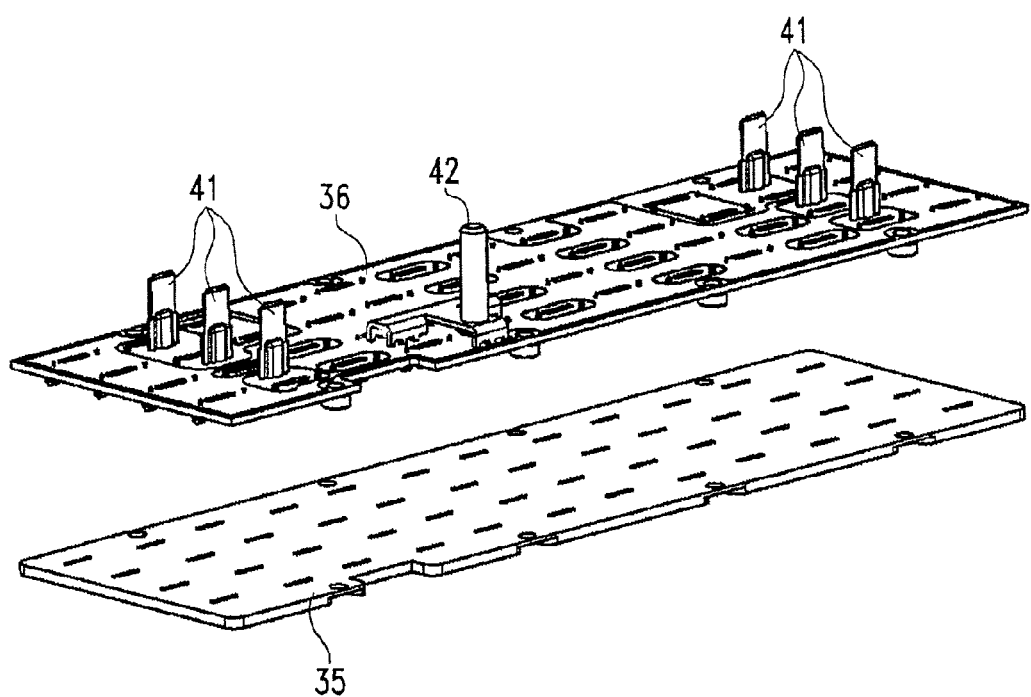
FIG. 5 two plates to be placed onto the part shown in FIG. 1.
Figure 6:
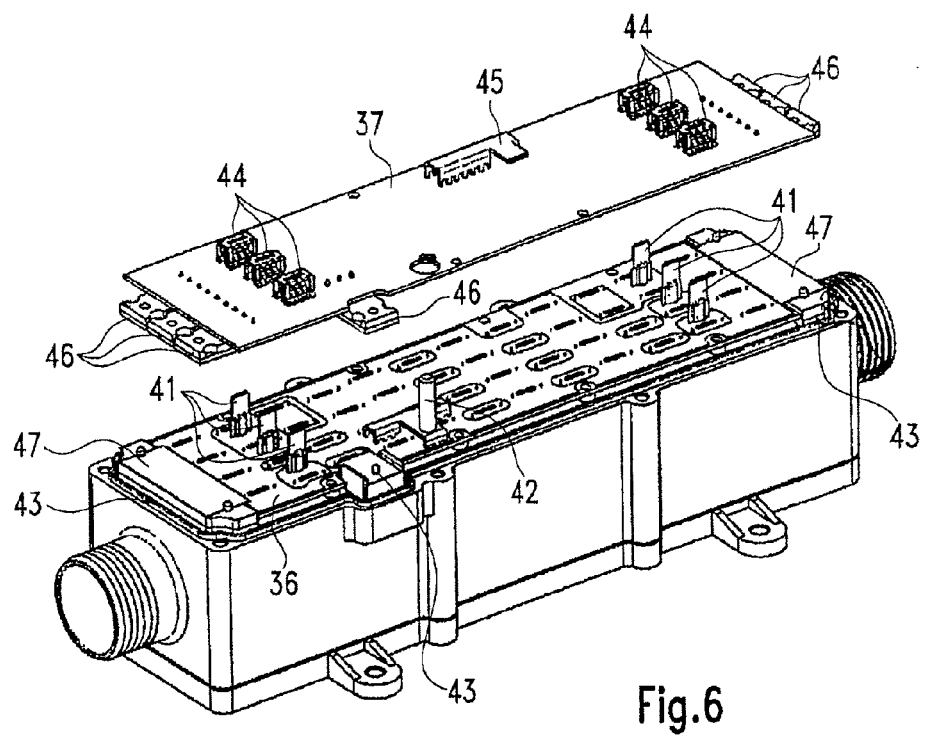
FIG. 6 the embodiment according to FIG. 1 with plates according to FIG. 5 set onto the part.
Figure 7:
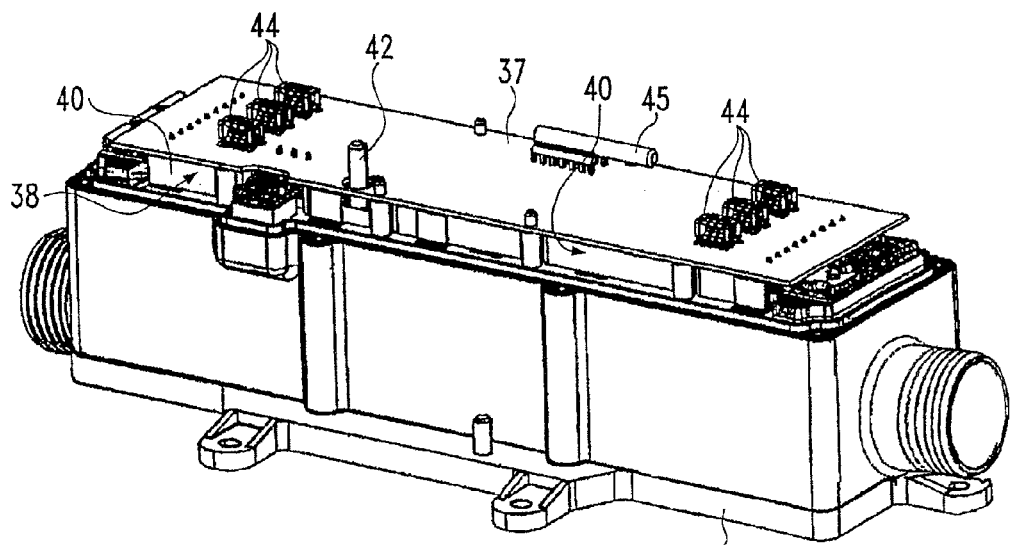
FIG. 7 the embodiment according to FIG. 1 with the second printed circuit board placed upon it.
Figure 8:
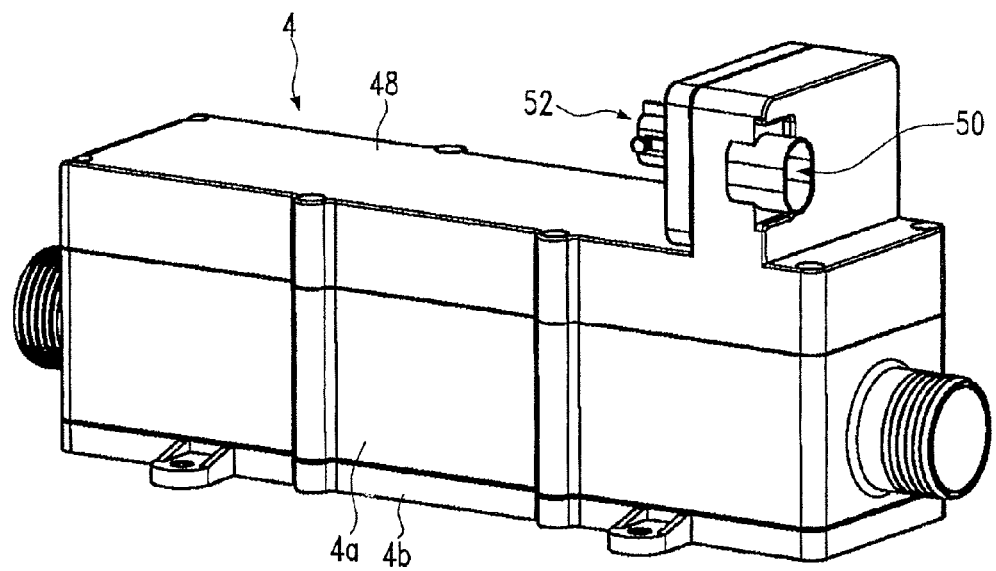
FIG. 8 the embodiment shown in the preceding figures with the cover placed upon it.

As can be seen in FIG. 1, the extension sections 34 project beyond the upper side of the separating wall 12 and lie freely in the heating chamber 14. The plates shown in FIG. 5, namely an insulating plate 35 and a first printed circuit board 36, are slid on to these extension sections 26. The insulating plate 35 is made from an electrically insulating material and has a hole pattern corresponding to the size and position of the extension sections. The openings cut into the insulating plate 35 for the extension sections 26 serve to guide the extension sections 26 and to ensure insulation. Furthermore, the insulating plate 35 has recesses and receptacles for parts of the first printed circuit board 36 that protrude from the first printed circuit board 36.

The first printed circuit board 36 has two contact receptacles 38 for each recess 16, whereby said contact receptacles 38 are formed by bent and pre-tensed extension section receptacles 40 that hold the extension sections 26 (cf. particularly FIG. 3). In an alternative development, not shown here, the contact receptacles can also be formed by two opposing contact plates, whose clear spacing is selected in such a way that the extension sections held in the contact receptacles lie against the contact plates with an initial tension. In such a case, a number of extension sections of electrical elements arranged one behind the other are connected in series via the contact plates. In the embodiment shown, the electrical grouping of heating elements 18 is produced by the strip conductors of the first distributor plate 36, which is accordingly also indicated as a printed circuit board.

Six tab elements 41 and a cylindrical connecting element 42 for the positive phase project beyond the first printed circuit board 36 on the upper side facing away from the heating elements 18, whereby each projection is arranged on the first printed circuit board 36. The first printed circuit board 36 lies approximately at the height of the supporting surfaces 43 that are provided on the frontal ends of the housing frame 4a. The first printed circuit board 36 has no electronic components, but instead only strip conductors and the previously mentioned connecting elements 41, 42, and consequently the first printed circuit board 36 serves only to combine individual electric heating elements 18 into groups, with a view to the control of all electric heating elements in a group.

The second printed circuit board 37 has six plug-in contact receptacles 44 assigned to the contact stud elements 41, whereby these plug-in contact receptacles 44 are arranged on the upper side of the second printed circuit board 37. Furthermore, a negative connecting element 45 is provided on the upper side of the second printed circuit board 37. On its underside, the second printed circuit board 37 carries electric switching elements, particularly semiconductor switches 46 which project beyond the second printed circuit board 37 frontally or at the end and, with an insulating layer 47 placed in between, lie against the supporting surfaces 43 so that, because of the direct contact created in this way, it is possible to dissipate lost heat generated by the semiconductor switches 46 by conducting it into the housing 4, seeing that the second printed circuit board 37 is mounted at a distance to the first printed circuit board 36. The contact stud elements 41 then engage in the corresponding plug-in contact receptacles 44. The positive connecting element 42 protrudes through a recess cut into the second printed circuit board 37 and projects beyond the second printed circuit board 37. The subsequent contacting takes place on the two connecting elements 42 and 45 when a housing cover 48 is placed in position. This cover has a power terminal 50 and a signal terminal 52 on its upper side and serves to seal the heating chamber 14 off from the surroundings.

The embodiment shown in the drawing has 24 heating elements, each with four PTC heating elements and, surprisingly, it has been seen that this electric heating device can deliver thermal heat output of more than 10 kW. With this output, the energy of an electric drive created by the generator operation that cannot be stored can be converted into thermal energy via the heating device.

We claim:

1. Electric heating device comprising:
   a housing, in which an imperforated separating wall is formed that divides the housing into a heating chamber and a circulation chamber which are fluidically separated from one another by the separating wall, wherein a liquid is held in and flows through the circulation chamber, wherein a portion of the separating wall protrudes into the circulation chamber and forms at least one U-shaped recess having a closed end and an open end, wherein the U-shaped recess is fluidically isolated from the circulation chamber, wherein the open end of the U-shaped recess is open to the heating chamber, wherein the liquid flows around opposed sides of said portion of the separating wall;
   an inlet opening, formed in the circulation chamber, for feeding the liquid into the circulation chamber and an outlet opening, formed in the circulation chamber, for guiding the liquid out of the circulation chamber, wherein said U-shaped recess provides opposing side pieces that are at least partially conically shaped, and wherein an electric heating element comprising at least one positive thermal coefficient heating element is held in the U-shaped recess;
   a printed circuit board which is provided in the heating chamber and to which the at least one positive thermal coefficient heating element is connected;
   wherein a pressure element is arranged between one of the side pieces of the U-shaped recess and the electric heating element, which pressure element lies flat against the electric heating element and the side piece,
   wherein the electric heating element further comprises two electrically insulating plates arranged parallel to one another, and wherein the at least one positive thermal coefficient heating element is arranged between the electrically insulating plates and two contact plates, which lie against both sides of the at least one positive thermal coefficient heating element and which are arranged between the at least one positive thermal coefficient heating element and the two electrically insulating plates, and wherein the contact plates each have diagonally opposing extension sections that project beyond an upper end of the electrically insulating plates, wherein a size of a surface area of the contact plates arranged between the insulating plates corresponds to the outer surface of the at least one positive thermal coefficient heating element facing the interior side of the insulating plate in each case.

2. Electric heating device according to claim 1, wherein the length of the housing is greater than its width and wherein the inlet and outlet openings are provided along the length at opposing ends of the housing.

3. Electric heating device according to claim 1, wherein the U-shaped recess is sealed off from the circulation chamber.

4. Electric heating device according to claim 1, wherein the thickness of the electric heating element roughly corresponds to the width of the recess.

5. Electric heating device according claim 1, wherein the at least one U-shaped recess comprises a plurality of U-shaped recesses that are formed along the width of the housing parallel to each other and one behind the other.

6. Electric heating device according to claim 5, wherein the plurality of U-shaped recesses are formed by a plurality of portions of the separating wall and wherein the plurality of portions project into the circulation chamber with an equal penetration depth.

7. Electric heating device according to claim 5, wherein a plurality of electric heating elements, one behind the other, are held in each of the plurality of U-shaped recesses along the length of each of the respective plurality of the recesses.

8. Electric heating device according to claim 1, wherein the electric heating element stands on a tab of the U-shaped recess.

9. Electric beating device according to claim 1, wherein the pressure element is formed as a wedge-shaped plate made of metal and that the electric heating element lies flat against the other side piece of the U-shaped recess and under tension introduced by the pressure element.

10. Electric beating device according to claim 1, wherein the length of the housing is greater than its width and that the inlet and outlet openings are provided along the length at opposing ends of the housing.

11. Electric heating device according to claim 1, wherein the portion of the separating wall forms a plurality of recesses, which are formed along the width of the housing parallel to each other and one behind the other and that the portion of the separating wall projects into the circulation chamber with equal penetration depth.

12. Electric heating device according to claim 11, wherein a number of electric heating elements, one behind the other, are held in each of the plurality of U-shaped recesses along the length of each of the respective plurality of U-shaped recesses.

13. Electric heating device according to claim 1, wherein the electric heating element stands on a tab of the U-shaped recess.

14. Electric heating device according to claim 1, wherein the contact receptacle for the extension sections of a number of electric heating elements arranged in a row, one behind the other, is formed by contact plates that lie opposite one another and that lie on the extension sections with an initial tension.

15. Electric heating device according to claim 1, wherein the device furthermore comprises a cover having a power and signal terminal, wherein this cover seals the heating chamber and bears contact counter-elements that interact with contact elements formed on the top side of a printed circuit board.

16. Electric heating device according to claim 15, wherein the contact elements and the contact counter-elements can be slid into one another forming a contact when the cover is placed on the housing.

17. A recuperator for converting electrical energy into thermal energy, the recuperator comprising:

an electric heating device comprising, a housing, in which an imperforated separating wall is formed that divides the housing into a heating chamber and a circulation chamber which are fluidically separated from one another by the separating wall, wherein a liquid is held in and flows through the circulation chamber, wherein a portion of the separating wall protrudes into the circulation chamber and forms a plurality of U-shaped recesses each having a closed end and an open end, wherein the U-shaped recesses are fluidically isolated from the circulation chamber, wherein the open ends of the U-shaped recesses are open to the heating chamber, and wherein the liquid flows on opposed sides of said portion of the separating wall;

an inlet opening, formed in the circulation chamber, for feeding the liquid into the circulation chamber and an outlet opening, formed in the circulation chamber, for guiding the liquid out of the circulation chamber, wherein said U-shaped recesses each provides opposing side pieces that are at least partially conically shaped, and wherein a plurality of electric heating elements comprising at least one positive thermal coefficient heating element are held in the U-shaped recesses;

a printed circuit board disposed in the heating chamber and to which the plurality of electric heating elements are coupled; and wherein a pressure element which is arranged between one of the side pieces in each of the U-shaped recesses and the electric heating element, and which lies flat against the electric heating element and the side piece.

18. The recuperator according to claim 17, wherein the electric heating element comprises two electrically insulating plates arranged parallel to one another, and wherein the at least one positive thermal coefficient heating element is arranged between the insulating plates and two contact plates, which lie against both sides of the at least of one positive thermal coefficient heating element and are arranged between the two contact plates and the electrically insulating plates.

19. The recuperator according to claim 17, wherein the length of the housing is greater than its width and that the inlet and outlet openings are provided along the length at opposing ends of the housing.

20. The recuperator according to claim 17, wherein the portion of the separating wall comprises a plurality of portions forming the plural U-shaped recesses, and wherein the plurality of U-shaped recesses that are formed along the width of the housing parallel to each other and one behind the other, and wherein the plurality of portions of the separating wall project into the circulation chamber with an equal penetration depth.

21. The recuperator according to claim 20, wherein a number of electric heating elements, one behind the other, are held in each of the plurality of U-shaped recesses along the length of each of the respective U-shaped recess.

22. The recuperator according to claim 17, wherein the electric heating element stands on a tab of the U-shaped recess.

23. The recuperator according to claim 17, wherein the pressure element is formed as a wedge-shaped plate made of metal and the electric heating element lies flat against the other side piece of the U-shaped recess under tension by the pressure element.

24. The recuperator according to claim 18, wherein the contact plates each have diagonally opposing extension sections that project beyond the upper end of the electrically insulating plates, wherein the size of the surface area of the contact plates arranged between the insulating plates corresponds to the outer surface of the at least one positive thermal coefficient heating element facing the interior side of the insulating plate in each case.

25. The recuperator according to claim 24, wherein the upper ends of the respective extension sections are arranged at the same height as the electric heating elements arranged in the recess and, in the area of the extension sections, at least one support surface is provided for a printed circuit board, wherein the printed circuit board has contact receptacles on its underside that faces the extension sections, wherein the extension sections can be slid into the contact receptacles.

26. The recuperator according to claim 25, wherein the contact receptacle for the extension sections of a number of electric heating elements arranged in a row, one behind the other, is formed by the contact plates that lie opposite one another and that lie on the extension sections with an initial tension.

27. The recuperator according to claim 17, wherein the device furthermore comprises a cover having a power and signal terminal, wherein this cover seals the heating chamber and bears contact counter-elements that interact with contact elements formed on the top side of a printed circuit board.

28. A recuperator for converting electrical energy into thermal energy, the recuperator comprising:
an electric heating device comprising,
a housing in which an imperforated separating wall is formed that divides the housing into a heating chamber and a circulation chamber which are fluidically separated from one another by the separating wall, wherein a liquid is held in and flows through the circulation chamber, wherein a portion of the separating wall protrudes into the circulation chamber and forms at least one U-shaped recess having a closed end and an open end, wherein the U-shaped recess is fluidically isolated from the circulation chamber, wherein the open end of the U-shaped recess is open to the heating chamber, and wherein the liquid flows on opposed sides of said portion of the separating wall;
an inlet opening, formed in the circulation chamber, for feeding the liquid into the circulation chamber and an outlet opening, formed in the circulation chamber, for guiding the liquid out of the circulation chamber, wherein said U-shaped recess provides opposing side pieces that are at least partially conically shaped, and wherein an electric heating element comprising at least one positive thermal coefficient heating element is held in the U-shaped recess;
a printed circuit board that is disposed in the heating chamber and that carries at least one semiconductor switch on its underside, which switch projects from said printed circuit board and lies against a supporting surface of the housing with an insulating layer placed in between, wherein the switch operates to transfer heat to the housing.

29. The recuperator of claim 28, further comprising a plurality of electric heating elements with positive thermal coefficient heating elements, the electric heating elements being arranged between contact plates having extension sections formed thereto, wherein the extension sections are exposed in the heating chamber, and further comprising a further printed, circuit board having contact receptacles slid on the extension sections, wherein the further printed circuit board is projected on the upper side, facing away from the positive thermal coefficient heating elements via contact stud elements, wherein the circuit board carrying the at least one semiconductor switch has plug-in contact receptacles for the contact stud elements, wherein the further printed circuit board provides contacting paths by which single heating elements are electrically grouped.

30. Electric heating device comprising:
a housing, in which a separating wall is formed that divides the housing into a heating chamber and a circulation chamber that holds a medium and through which the medium flows;
an inlet opening, formed in the circulation chamber, for feeding the medium into the circulation chamber and an outlet opening, formed in the circulation chamber, for guiding the heated medium out of the circulation chamber, plural electric heating elements with positive thermal coefficient heating elements, arranged between contact plates having extension sections formed thereto, which are exposed in the heating chamber,
which electric heating device further comprises 1) a first printed circuit board which provides contact receptacles slid on the extension sections, and 2) a second printed circuit hoard,
wherein the second printed circuit board bears electrical control elements and the first printed circuit board provides conducting paths through which the electrical heating elements are grouped for control by the electrical control elements.

31. The electric heating device of claim 30, wherein the first printed circuit board is projected on the upper side facing away from the positive thermal coefficient heating elements by contact stud elements and wherein the second printed circuit board has plug-in contact receptacles for the contact stud elements.

32. The electric heating device of claim 31, wherein the first printed circuit board is projected by an electric contact element, which protrudes through a recess cut in the second printed circuit board and projects beyond the same.

33. The electric heating device of claim 31, wherein the second printed circuit board bears a minus-contact element on its upper side facing away from the first printed circuit board.

34. The electric heating device of claim 32, wherein the second printed circuit board bears a minus-contact element on its upper side facing away from the first printed circuit board.

35. The electric heating device of claim 31, wherein the device further comprises a cover having a power and signal terminal, wherein the cover seals the heating chamber and bears contact counter-elements that interact with contact elements formed on the top side of the second printed circuit board.

36. The electric heating device of claim 35, wherein the contact elements and the contact counter-elements can be slid into one another forming a contact when the cover is placed on the housing.

* * * * *